(12) United States Patent
Ricks

(10) Patent No.: US 8,512,781 B2
(45) Date of Patent: Aug. 20, 2013

(54) FRESH FRUIT PRESERVATIVE AND METHOD OF USING SAME

(75) Inventor: John Ricks, Idaho Falls, ID (US)

(73) Assignee: PFM, LLC, Rexburg, ID (US)

( * ) Notice: Subject to any disclaimer, the term of this patent is extended or adjusted under 35 U.S.C. 154(b) by 108 days.

(21) Appl. No.: 12/860,065

(22) Filed: Aug. 20, 2010

(65) Prior Publication Data

US 2012/0045555 A1 Feb. 23, 2012

(51) Int. Cl.
*A23L 3/34* (2006.01)

(52) U.S. Cl.
USPC .............. 426/335; 426/74; 426/321; 426/615

(58) Field of Classification Search
USPC .......................... 426/330.5, 335, 74, 615, 321
See application file for complete search history.

(56) References Cited

U.S. PATENT DOCUMENTS

| | | | |
|---|---|---|---|
| 3,978,235 A | 8/1976 | Schiro | |
| 4,336,273 A | 6/1982 | Lee | |
| 4,649,057 A | 3/1987 | Thomson | |
| 4,818,549 A | 4/1989 | Steiner et al. | |
| 4,911,940 A | 3/1990 | Steiner et al. | |
| 4,988,523 A | 1/1991 | Gardner et al. | |
| 5,126,153 A | 6/1992 | Beck | |
| 5,346,712 A | 9/1994 | Cherry et al. | |
| 5,840,356 A | 11/1998 | Swensen | |
| 5,922,382 A | 7/1999 | Powrie et al. | |
| 5,925,395 A | 7/1999 | Chen | |
| 5,939,117 A | 8/1999 | Chen | |
| 5,945,146 A | 8/1999 | Twinam | |
| 6,403,139 B1 | 6/2002 | Sardo et al. | |
| 6,749,875 B2 | 6/2004 | Selleck | |
| 6,977,090 B2 | 12/2005 | Petcavich | |
| 7,931,926 B2 | 4/2011 | Lidster et al. | |
| 8,101,221 B2 * | 1/2012 | Chen et al. | .................... 426/321 |

FOREIGN PATENT DOCUMENTS

| | | |
|---|---|---|
| EP | 0 859 551 | 2/2002 |
| WO | WO 94/12041 | 6/1994 |
| WO | WO 97/23138 | 7/1997 |
| WO | WO 99/07230 | 2/1999 |

OTHER PUBLICATIONS

"Ball Fruit-Fresh Produce Protector", 2012, www.wegmans.com/webapp/wcs/stores/servlet/ProductDisplay?productID+356982&s . . . , pp. 1 and 2.*
CN 101223910 A, Chen et al. Derwent acc. No. 2008-J73262, abstract only , Jul. 23, 2008.*

* cited by examiner

*Primary Examiner* — Helen F Heggestad
(74) *Attorney, Agent, or Firm* — Morriss O'Bryant Compagni, PC

(57) ABSTRACT

A fresh fruit preservative and method of using the preservative for fresh cut fruit that significantly extend the shelf life of fresh cut fruit are provided. The fresh fruit preservative preserves the texture, flavor, appearance, and color of the fresh fruit, particularly exposed surfaces of the fresh fruit that have been cut, in particular by reducing oxidation of the exposed cut surfaces of the fruit. The preservative includes the ingredients of ascorbic acid, calcium ascorbate, carbohydrate, sodium chloride, magnesium chloride, potassium bicarbonate and malic acid.

21 Claims, No Drawings

FRESH FRUIT PRESERVATIVE AND METHOD OF USING SAME

BACKGROUND OF THE INVENTION

1. Field of the Invention

The present invention relates generally to preservatives for food and more specifically to a preservative that extends the shelf life of fresh cut fruit by reducing oxidation while preserving texture and flavor.

2. State of the Art

Fresh cut fruit will rapidly deteriorate once the fruit is exposed to air. This is particularly apparent when an apple is cut, and within minutes, the apple slices begin to brown. In addition, the flavor, texture, and crispness rapidly degrade and become significantly less appealing to be eaten. As such, it is often the case that fresh cut fruit is discarded because of its inability to maintain freshness over a relatively short period of time.

Some prior art methods of preserving fruit includes cooking, which changes the flavor, appearance and texture, freezing, which affects the texture and crispness, drying, which changes texture, flavor, crispness and appearance, refrigeration, which can help to preserve crispness and flavor but not appearance, the addition of films, such as wax films which are not desirable to be eaten, and the addition of chemical preservatives, which often significantly and detrimentally change the flavor of the food.

Natural substances such as salt, sugar, vinegar, alcohol, and diatomaceous earth are also used as traditional preservatives. Certain processes such as pickling, smoking and salting can also be used to preserve food but obviously have a significant effect on the flavor. Another group of preservatives targets enzymes in fruits and vegetables that continue to metabolize after they are cut. For instance, citric and ascorbic acids from lemon or other citrus juice can inhibit the action of the enzyme phenolase which turns surfaces of cut apples and potatoes brown. It is known in the art to use citric acid as a food preservative. Citric acid does help delay browning in fruits, but creates a sour taste in the fruit and also allows the fruit to lose its crispness. Sodium ascorbate has also been used to preserve fruit to prevent color degradation for a period of time, but produces a noticeable and unpleasing taste.

Ascorbic acid and its sodium, potassium, and calcium salts are commonly used as antioxidant food additives. These compounds are water-soluble and thus cannot protect fats from oxidation: For this purpose, the fat-soluble esters of ascorbic acid with long-chain fatty acids (ascorbyl palmitate or ascorbyl stearate) can be used as food antioxidants. Calcium ascorbate is a compound with the molecular formula $CaC_{12}H_{14}O_{12}$. It is the calcium salt of ascorbic acid, one of the mineral ascorbates. Among its many uses is to keep apples fresh, so they do not turn brown quickly.

U.S. Pat. No. 5,939,117 discloses a method of preserving fresh fruit with fresh fruit preservatives that claim to extend the shelf life of fresh fruit particularly fresh cut fruit. The method includes the steps of providing a solution of fruit preservative comprising water, calcium ions and ascorbate ions, wherein the calcium ions and ascorbate ions are present in a ion ratio of preferably from about 1.5:1 to about 2.5:1, and applying the fruit preservative to the fruit.

Among those familiar with the art have used various food preservatives, such as ascorbic acid and its sodium, potassium, and calcium salts to prevent oxidation. In addition, other food preservatives have included ingredients such as calcium, calcium ascorbate, citric acid, sodium acid pyrophosphate (SAPP), calcium chloride and sodium chloride. Each of these prior art preservatives, however, have a detrimental effect on the flavor of the fruit and often have limited effectiveness. Accordingly, it would be advantageous to provide a food preservative composition and method of using the composition to preserve fresh cut fruit that preserves the appearance, color and crispness for a period of days or weeks, and that has either no palatable affect or actually enhances the flavor of the fruit. The present invention provides a food preservative that includes, inter alia, naturally occurring nutrients in the fruit to preserve color, taste, texture and shelf life of fresh cut fruit.

SUMMARY OF THE INVENTION

The present invention pertains to chemical compositions and methods using these compositions for preserving fresh fruit that extend the shelf life of fresh fruit, particularly cut fresh fruit. A fresh fruit preservative according to the present invention preserves the texture, flavor, appearance, crispness, and color of the fresh fruit, particularly the exposed surfaces of fresh cut fruit. In particular, the present invention provides a chemical composition and method of using the chemical composition for the preservation of food, and in particular, fresh cut fruit. The composition can be used alone or in conjunction with other methods of food preservation. The composition includes preservatives that act as antimicrobial preservatives, which inhibit the growth of bacteria and fungi, including mold, and antioxidants, such as oxygen absorbers, which inhibit the oxidation of food constituents.

A method and solution of preserving fresh cut fruit according to the present invention includes a fresh fruit preservative solution comprising water, ascorbic acid, calcium ascorbate, carbohydrate, sodium chloride, magnesium chloride, potassium bicarbonate and malic acid, and applying the fresh fruit preservative solution to fresh cut fruit.

In one embodiment, the preservative includes ascorbic acid in a percentage by weight of 10% to 92.8%, calcium ascorbate in a percentage by weight of 1% to 67.7%, carbohydrate in a percentage by weight of 0.1% to 85%, sodium chloride in a percentage by weight of 0.05% to 12%, magnesium chloride in a percentage by weight of 0.01% to 12.6%, potassium bicarbonate in a percentage by weight of 0.001% to 9.8% and malic acid in a percentage by weight of 0.00001% to 15%.

In another embodiment, the preservative comprises ascorbic acid in a percentage by weight of 55% to 92%, calcium ascorbate in a percentage by weight of 2.5% to 15%, carbohydrate in a percentage by weight of 5% to 62%, sodium chloride in a percentage by weight of 0.3 to 3%, and malic acid in a percentage by weight of 0.01% to 12.9%.

In yet another embodiment, the preservative comprises ascorbic acid in a percentage by weight of 65.9% to 86.8%, calcium ascorbate in a percentage by weight of 7.8% and 12.9%, carbohydrate in a percentage by weight of 12.2% to 21%, sodium chloride in a percentage by weight of 0.3 to 3%, and malic acid in a percentage by weight of 0.1% and 11.3%.

In still another embodiment, the preservative comprises calcium chloride. The calcium chloride may be provided in a percentage by weight of 0.01% to 15%

In another embodiment, the carbohydrate is provided in the form of maltodextrin

In yet another embodiment, the maltodextrin is provided in a percentage by weight of approximately 3.4%

In another embodiment, the preservative includes vitamin E in a percentage by weight of approximately 0.00066%

In still another embodiment, the preservative includes silicon dioxide.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

The present invention pertains to methods of preserving fresh, that is, uncooked, fruit with a fresh fruit preservative which extends the shelf life of the fresh fruit, particularly freshly cut fruit. The fresh fruit preservative preserves the texture, flavor, appearance, crispness and color of the fruit, such as for example, apples and pears. A method of preserving fresh cut fruit pieces according to the present invention uses a combination of known preservatives and naturally occurring nutrients in fresh fruits The method inhibits freshly cut fruit from browning; for example, fruits are prevented from browning for at least one week or more while maintaining the freshness, crispness, texture, color and flavor of the fruit without any residual taste. The exact length of the period of preservation depends upon the initial fruit quality, the species and the variety of the fruit and growing conditions of the fruit. The period of preservation can also be extended by adding refrigeration to the method. The method of the present invention offers the advantage in that the preserved apples may be stored under standard atmospheric pressure and standard atmospheric conditions; that is, the method does not require that the apples be stored under vacuum or inert atmosphere. The method of preserving fruit does not require that the food be cooked, dried or frozen. The method offers the advantage in that it does not require preservatives such as sulfites. However, after the fruit is preserved with the fresh fruit preservative, it may be dried or freeze dried for use as for example food or potpourri; the fresh fruit preservative will further delay the browning that eventually occurs in dried and freeze dried fruits. In the event that such dried or freeze dried fruit is reconstituted, the fruit will be less brown than had the fruit not been preserved with the fresh fruit preservative The fresh fruit preservative includes a combination of potassium bicarbonate along with a combination of at least some of the following ingredients: malic acid in a percentage by weight of 0.00001% to 15%, carbohydrate in a percentage by weight of 0.1% to 85%, calcium chloride in a percentage by weight of 1% to 15% or magnesium chloride in a percentage by weight of 0.01% to 12.6%, ascorbic acid in a percentage by weight of 10% to 92.8%, calcium ascorbate in a percentage by weight of 1% to 67.7%, potassium bicarbonate percentage by weight of 0.001% to 9.8%, calcium chloride in a percentage by weight of 0.01% to 15% and sodium chloride in a percentage by weight of 0.05% to 12%

In one particular combination of ingredients, the fresh fruit preservative of the present invention includes approximately 88% by weight of ascorbic acid, approximately 2.4% by weight of maltodextrin, approximately 2.0% of calcium ascorbate, approximately 0.8% by weight of sodium chloride, approximately 0.8% by weight of magnesium chloride, approximately 0.6% by weight of malic acid, approximately 4.4% by weight of potassium bicarbonate, approximately 0.00066% of vitamin E and a trace amount of silicon dioxide The ascorbic acid a sugar acid and is provided for its antioxidant properties and because it is water-soluble. The ascorbic acid may also be in the form of one of its sodium, potassium or calcium salts. Also, the fat-soluble esters of ascorbic acid with long-chain fatty acids (ascorbyl palmitate or ascorbyl stearate) can be used The maltodextrin is a polysaccharide produced from starch by partial hydrolysis. Maltodextrin is easily digestible, being absorbed as rapidly as glucose, and provides a sweetness to the food preservative mixture of the present invention.

The calcium ascorbate is the calcium salt of ascorbic acid, one of the mineral ascorbates. The sodium chloride, also known as salt, common salt, table salt, or halite, is an ionic compound and assists in both preserving the fresh fruit, through its hygroscopic properties, and enhancing the flavor of the food preservative mixture of the present invention. Essentially, the salt draws water out of bacteria through osmotic pressure preventing the bacteria from reproducing which will otherwise cause the food to spoil. While, more effective desiccants are available, few are safe for humans to ingest Calcium chloride has an extremely salty taste. It can be used in the present invention as a preservative to maintain firmness and to enhance the flavor of the fruit by its salty taste while not increasing the food's sodium content Potassium bicarbonate (also known as potassium hydrogen carbonate or potassium acid carbonate), is a colorless, odorless, slightly basic, salty substance. Potassium bicarbonate is soluble in water, and is typically provided to enhance flavor. Tests set forth herein, however, indicate that the addition of potassium bicarbonate to the food preservative mixture has a particularly beneficial and unexpected effect on the shelf life of fresh cut fruit when combined with other ingredients set forth herein to help reduce oxidation and enhance texture and flavor.

The malic acid is an organic compound found mostly in unripe fruits and contributes to the sourness of green apples and has a sour or tart taste. The tests set forth herein, however, indicate that the addition of the malic acid to the food preservative mixture has a particularly beneficial and unexpected effect on the shelf life of the fruit when combined with other ingredients set forth herein.

Vitamin E is the generic term for tocopherols and tocotrienols. Vitamin E is a family of $\alpha$-, $\beta$-, $\gamma$-, and $\delta$- (respectively: alpha, beta, gamma, and delta) tocopherols and corresponding four tocotrienols. The vitamin E is in the food preservative mixture acts as a fat-soluble antioxidant that stops the production of reactive oxygen species formed when fat undergoes oxidation and prevents oils from going rancid and other damage to the food due to exposure to oxygen. The vitamin E blocks the formation of free radicals in the food fats by stabilizing their molecular structure The magnesium chloride and its various hydrates ($MgCl_2$ $(H_2O)_x$), are salts that are typical ionic halides, being highly soluble in water. The magnesium chloride in the mixture serves as a coagulant.

The silicon dioxide, also known as silica functions as an anti-caking agent to prevent the ingredients of the food preservative according to the present invention from binding together.

It should be noted that the specifically recited compounds include related salts thereof where applicable, and the recitation of such compounds in the claims is intended to encompass such salts.

A method of preserving fresh cut fruit according to the principles of the present invention includes the steps of providing a solution of fruit preservative comprising: water, in a water to preservative ratio of approximately 4

Fluid oz to 8 grams, ascorbic acid, calcium ascorbate, carbohydrate, sodium chloride, magnesium chloride, potassium bicarbonate, and malic acid. The solution is applied to fresh fruit to preservative fresh cut fruit. The method comprises providing the ascorbic acid in a percentage by weight of 10% to 92.8%, providing the calcium ascorbate in a percentage by weight of 1% to 67.7%, providing the carbohydrate in a percentage by weight of 0.1% to 85%, providing the sodium chloride in a percentage by weight of 0.05% to 12%, providing the magnesium chloride in a percentage by weight of 0.01% to 12.6%, providing the potassium bicarbonate in a percentage by weight of 0.001% to 9.8% and providing the malic acid in a percentage by weight of 0.00001% to 15%. In a particular embodiment, the method comprises providing the ascorbic acid in a percentage by weight of 55% to 92%, providing the calcium ascorbate in a percentage by weight of 2.5% to 15%, providing the carbohydrate in a percentage by weight of 5% to 62%, providing the sodium chloride in a percentage by weight of 0.3 to 3%, and providing the malic acid in a percentage by weight of 0.01% to 12.9%. In yet another embodiment, the method comprises providing the ascorbic acid in a percentage by weight of 65.9% to 86.8%, providing the calcium ascorbate in a percentage by weight of 7.8% and 12.9%, providing the carbohydrate in a percentage by weight of 12.2% to 21%, providing the sodium chloride in a percentage by weight of 0.3 to 3%, and providing the malic acid in a percentage by weight of 0.1% and 11.3%. The method may also include providing calcium chloride to the fresh fruit preservative solution in a percentage by weight of 0.01% to 15%. Calcium chloride may be provided in a percentage by weight of 0.2% to 3%. The carbohydrate may be provided in the form of maltodextrin in a percentage by weight of approximately 3.4%. In addition, the solution may include vitamin E in a percentage by weight of approximately 0.00066%. Silicon dioxide may also be added to the to the fresh fruit preservative, solution.

The fresh fruit such as for example, apples or pears, are rinsed to reduce or eliminate microorganisms on the surface of the fruit skin. The fruit is then processed such as for example, by paring, slicing, coring, dicing, peeling or a combination thereof; and then the fruit preservative is applied. The fruit preservative is applied by conventional techniques such as spraying, dipping, sprinkling tossing, immersing or drenching. Dipping involves immersing the fruit into a solution of fruit preservative. Good results have been obtained by dipping fruit about 1-2 minutes.

The fruit is can then be placed in package to prevent or reduce drying where the fruit is to be transported or sitting on a shelf. However, where the fruit is to be consumed with several hours from slicing or peeling the fruit is not packaged. To further reduce microbial growth, when consumption is not to occur for several hours or days, the fresh fruit should be stored in a refrigerator at a temperature of approximately 34 to 50 degrees Fahrenheit. While the fruit may be stored at ambient temperatures around 20 degrees C., shelf life is increased by storing below 20 degrees C. The fruit should also be stored above 0 degrees C. to prevent freezing.

The present invention provides a chemical mixture and resulting solution that increases the stability and shelf life of fresh cut fruit pieces. Once fruit is cut the exposed surfaces are exposed oxygen, the oxygen in the air causes oxidation or browning of the exposed cut surfaces. The present invention provides a chemical solution that counteracts the oxidation process and stabilizes the fruit preventing browning of the exposed cut surfaces. As a result of being preserved with fresh fruit preservative, the degradation of the color of the fruit is substantially reduced.

The texture, flavor, and moistness of the fruit were evaluated by tasting fruit samples. Color was also evaluated by visual inspection. The color, texture, moistness and flavor were then evaluated according to a scale of either 1 to 5, with 5 being the value assigned to a freshly cut piece of comparative fruit.

The following mixtures containing the dry ingredients of the fresh fruit preservatives are provided by way of examples and not by limitation. The ingredients were FCC or USP grade unless otherwise indicated.

Ingredients were tested singularly and in combinations to determine the variable balance required for optimum retardation of oxidation which causes fruit pieces to turn an unappetizing brown color. When tested singularly the ingredients had minimal effects on retardation of oxidation, however with a particular combination of ingredients the fruit pieces maintain natural color, texture, and flavor for extended time periods of days Starting with a solution of purified water and ascorbic acid, one compound, such as a vitamin or mineral, at a time was added to the solution. Incremental changes in the overall stabilization of oxidation, texture, and flavor of fresh cut fruit were then measured. Subsequent tests were conducted on fresh cut apple slices to ascertain the efficacy of each combination of ingredients, with each subsequent test adding a particular vitamin, mineral and/or compound, including magnesium chloride, calcium chloride, malic acid and/or a carbohydrate. Further testing included added other chemical compounds such as calcium ascorbate, maltodextrin, sodium chloride, potassium bicarbonate, sodium bicarbonate and calcium bicarbonate Unexpected results occurred when fresh cut apple slices were exposed to a solution of potassium bicarbonate along with a combination of at least some of the following ingredients: malic acid in a percentage by weight of 0.00001% to 15%; carbohydrate in a percentage by weight of 0.1% to 85%; magnesium chloride in a percentage by weight of 0.01% to 12.6%; ascorbic acid in a percentage by weight of 10% to 92.8%; calcium ascorbate in a percentage by weight of 1% to 67.7%; potassium bicarbonate in a percentage by weight of 0.001% to 9.8%; calcium chloride in a percentage by weight of 0.01% to 15%; and sodium chloride in a percentage by weight of 0.05% to 12%

Through testing of the various combinations of ingredients, unexpected results were attained in the reduction of oxidation in fruit as well as preservation of texture and flavor. These results were attained by combinations of ingredients that included ascorbic acid, a carbohydrate and calcium ascorbate. In particular, the percentage by weight percentage of ascorbic acid performed well in a percentage by weight range of 10% to 92.8%, with better results at a percentage by weight of 55% to 92% and the best results with a percentage by weight of 65.9% to 86.8%. Similarly, the percentage by weight percentage of carbohydrate demonstrated beneficial results in a percentage by weight of 0.1% to 85%, with better results at a percentage by weight of 5% to 62%, and the best results with a percentage by weight of 12.2% to 21%. The effects of the addition of calcium ascorbate demonstrated beneficial effects in a percentage by weight range of 1% to 67.7%, with better results at a percentage by weight of 2.5% to 15%, and the best results when the percentage by weight was between approximately 7.8% and 12.9%. The percentage by weight of sodium chloride demonstrated beneficial effects when the percentage by weight was 0.05% to 12%, with better results at a percentage by weight of 0.3 to 3%. The percentage by weight of calcium chloride demonstrated beneficial effects when the percentage by weight was 0.01% to 15%, with better results at a percentage by weight of 0.2 to 3%. Finally, the percentage by weight of malic acid demonstrated beneficial effects at a percentage by weight of 0.00001% to 0.15%, with better results when the percentage by weight of malic acid was 0.01% to 12.9% and best effects when the percentage by weight was between 0.1 and 11.3%.

For testing granny smith and gala apples where washed in chlorinated water then cut into wedges. The wedges where then exposed to various solutions containing various combinations of ingredients. The ingredients were dissolved in water at a concentration ratio of approximately 2:1. For example, 2 grams of dry ingredient mixture were added to 1 fluid ounce of water. The apple slices were then placed in the liquid solution for a period of 1 to 2 minutes. Subsequently, the apple slices were placed in open air at room temperature of approximately 65-75 degrees Fahrenheit and observed for color preservation and tasted for texture (which included crispness) and flavor. The apple slices were graded on a scale from 0 to 5 with 5 being the best for color, texture, and flavor 1 to 20 days after exposure to the medium the apples slices where packaged in zip lock bags and refrigerated. The following tests were performed with each example containing a different combination of ingredients.

Example 1

| Solution of purified water and ascorbic acid | | | |
| --- | --- | --- | --- |
| Time | Color | Texture | Flavor |
| 6 hrs | 3 | 4 | 1 |
| 1 day | 1 | 3 | 1 |
| 1 week | 0 | 2 | 0 |
| 20 days | 0 | 1 | 0 |

Example 2

| Solution of purified water, ascorbic acid and calcium ascorbate | | | |
| --- | --- | --- | --- |
| Time | Color | Texture | Flavor |
| 6 hrs | 4 | 4 | 1 |
| 1 day | 3 | 4 | 1 |
| 1 week | 1 | 3 | 1 |
| 20 days | 0 | 2 | 0 |

Example 3

| Solution of purified water, ascorbic acid, calcium ascorbate and carbohydrate | | | |
| --- | --- | --- | --- |
| Time | Color | Texture | Flavor |
| 6 hrs | 4 | 4 | 3 |
| 1 day | 3 | 4 | 3 |
| 1 week | 2.5 | 3 | 2 |
| 20 days | 1 | 1 | 1 |

Example 4

| Solution of purified water, ascorbic acid, calcium ascorbate, carbohydrate, sodium chloride and magnesium chloride | | | |
| --- | --- | --- | --- |
| Time | Color | Texture | Flavor |
| 6 hrs | 4 | 4 | 4 |
| 1 day | 3.5 | 4 | 3 |
| 1 week | 2.5 | 4 | 3 |
| 20 days | 1 | 3 | 1 |

Example 5

| Solution of purified water, ascorbic acid, calcium ascorbate, carbohydrate, sodium chloride, magnesium chloride, potassium bicarbonate, malic acid. | | | |
| --- | --- | --- | --- |
| Time | Color | Texture | Flavor |
| 6 hrs | 5 | 5 | 5 |
| 1 day | 5 | 5 | 5 |
| 1 week | 5 | 5 | 5 |
| 20 days | 4.5 | 5 | 4 |

Unexpectedly, color, texture and flavor were significantly increased by the addition of potassium bicarbonate and malic acid. Specifically, the shelf life of the apple slices maintained their freshness for a period of weeks. Thus, the best results were achieved when the solution included potassium bicarbonate and malic acid in addition to the other ingredients.

It would be apparent to those skilled in the art that some other ingredients may be added to the composition of the present invention, including equivalent compounds and substances without departing from the spirit and scope of the present invention. Thus, while there have been described various embodiments of the present invention, those skilled in the art will recognize that other and further changes and modifications may be made thereto without department from the spirit of the invention, and it is intended to claim all such changes and modifications that fall within the true scope of the invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods and structures of the present invention are described herein, any methods or substances similar or equivalent to those described herein may be used in the practice or testing of the present invention. All references cited herein are incorporated by reference in their entirety and for all purposes. In addition, while the foregoing advantages of the present invention are manifested in the illustrated embodiments of the invention, a variety of changes can be made to the composition of the invention to achieve those advantages including combinations of ingredients of the various embodiments. Hence, reference herein to specific details of the compositions and function of the present invention is by way of example only and not by way of limitation.

What is claimed is:

1. A method for preserving fresh cut fruit, comprising:
    forming a fresh fruit preservative solution by mixing with water a plurality of ingredients in relative percentage by weight to one another, the plurality of ingredients, comprising:
    ascorbic acid in a percentage by weight of 10% to 92.8%;
    calcium ascorbate in a percentage by weight of 1% to 67.7%;
    carbohydrate in a percentage by weight of 0.1% to 85%;
    sodium chloride in a percentage by weight of 0.05% to 12%;
    magnesium chloride in a percentage by weight of 0.01% to 12.6%;

potassium bicarbonate in a percentage by weight of 0.001% to 9.8%; and malic acid in a percentage by weight of 0.00001% to 15%; and applying the fresh fruit preservative solution to fresh cut fruit.

2. The method of claim 1, further comprising providing the ascorbic acid in a percentage by weight of 55% to 92%, providing the calcium ascorbate in a percentage by weight of 2.5% to 15%, providing the carbohydrate in a percentage by weight of 5% to 62%, providing the sodium chloride in a percentage by weight of 0.3 to 3%, and providing the malic acid in a percentage by weight of 0.01% to 12.9%.

3. The method of claim 2, further comprising providing the ascorbic acid in a percentage by weight of 65.9% to 86.8%, providing the calcium ascorbate in a percentage by weight of 7.8% and 12.9%, providing the carbohydrate in a percentage by weight of 12.2% to 21%, providing the sodium chloride in a percentage by weight of 0.3 to 3%, and providing the malic acid in a percentage by weight of 0.1% and 11.3%.

4. The method of claim 1, further comprising providing calcium chloride to the fresh fruit preservative solution.

5. The method of claim 4, further comprising providing the calcium chloride in a percentage by weight of 0.01% to 15%.

6. The method of claim 5, further comprising providing the calcium chloride in a percentage by weight of 0.2% to 3%.

7. The method of claim 1, further comprising wherein the carbohydrate is provided in the form of maltodextrin.

8. The method of claim 7, wherein the maltodextrin is provided in a percentage by weight of approximately 3.4%.

9. The method of claim 1, further comprising providing vitamin E to the fresh fruit preservative solution.

10. The method of claim 9, further comprising providing the vitamin E in a percentage by weight of approximately 0.00066%.

11. The method of claim 1, further comprising providing silicon dioxide to the fresh fruit preservative solution.

12. A preservative for fresh cut fruit, comprising:
ascorbic acid in a percentage by weight of 10% to 92.8%;
calcium ascorbate in a percentage by weight of 1% to 67.7%;
carbohydrate in a percentage by weight of 0.1% to 85%;
sodium chloride in a percentage by weight of 0.05% to 12%;
magnesium chloride in a percentage by weight of 0.01% to 12.6%;
potassium bicarbonate in a percentage by weight of 0.001% to 9.8%; and
malic acid in a percentage by weight of 0.00001% to 15%.

13. The preservative of claim 12, wherein the ascorbic acid is in a percentage by weight of 55% to 92%, the calcium ascorbate is in a percentage by weight of 2.5% to 15%, the carbohydrate is in a percentage by weight of 5% to 62%, the sodium chloride is in a percentage by weight of 0.3 to 3%, and the malic acid is in a percentage by weight of 0.01% to 12.9%.

14. The preservative of claim 13, wherein the ascorbic acid is in a percentage by weight of 65.9% to 86.8%, the calcium ascorbate is in a percentage by weight of 7.8% and 12.9%, the carbohydrate is in a percentage by weight of 12.2% to 21%, the sodium chloride is in a percentage by weight of 0.3 to 3%, and the malic acid is in a percentage by weight of 0.1% and 11.3%.

15. The preservative of claim 12, wherein the preservative further comprises calcium chloride in a percentage by weight of 0.01% to 15%.

16. The preservative of claim 15, wherein the calcium chloride is in a percentage by weight of 0.2% to 3%.

17. The preservative of claim 12, wherein the carbohydrate is in the form of maltodextrin.

18. The preservative of claim 17, wherein the maltodextrin is in a percentage by weight of approximately 3.4%.

19. The preservative of claim 12, further comprising vitamin E.

20. The preservative of claim 19, wherein the vitamin E is in a percentage by weight of approximately 0.00066%.

21. The preservative of claim 12, further comprising silicon dioxide.

* * * * *